United States Patent
Thamarasseri et al.

(10) Patent No.: US 12,430,606 B2
(45) Date of Patent: Sep. 30, 2025

(54) PLANOGRAM ITEM CATEGORY MODIFICATION

(71) Applicant: Target Brands, Inc., Minneapolis, MN (US)

(72) Inventors: Rajesh Thamarasseri, Karnataka (IN); Noah E. Dahlien, Minneapolis, MN (US); Chandramouli Pathipati, Minneapolis, MN (US); Derek Mooney, Minneapolis, MN (US); Kirti Kesavarapu, Minneapolis, MN (US); Ross W. Buchanan, St. Paul, MN (US); Carl Hendrickson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 382 days.

(21) Appl. No.: 17/879,666

(22) Filed: Aug. 2, 2022

(65) Prior Publication Data

US 2024/0046199 A1    Feb. 8, 2024

(51) Int. Cl.
*G06Q 10/087*    (2023.01)

(52) U.S. Cl.
CPC .................. *G06Q 10/087* (2013.01)

(58) Field of Classification Search
CPC .................................... G06Q 10/087
See application file for complete search history.

(56) References Cited

U.S. PATENT DOCUMENTS

| | | | |
|---|---|---|---|
| 5,576,755 A | * | 11/1996 | Davis .................. H04N 7/0887 |
| | | | 348/E7.054 |
| 7,885,865 B2 | | 2/2011 | Benson et al. |
| 9,336,508 B2 | | 5/2016 | Soon-Shiong |
| 10,031,974 B1 | | 7/2018 | Abdullah et al. |
| 10,726,448 B1 | | 7/2020 | Harwood |
| 2003/0171979 A1 | | 9/2003 | Jenkins |
| 2005/0203790 A1 | | 9/2005 | Cohen |
| 2006/0149634 A1 | | 7/2006 | Pelegrin et al. |
| 2011/0035257 A1 | | 2/2011 | Solanki et al. |

(Continued)

FOREIGN PATENT DOCUMENTS

EP    2672445 A1    12/2013

OTHER PUBLICATIONS

NPL Oracle_2014 (Oracle) published Dec. 2014 available at https://docs.oracle.com/cd/E16812_01/msm/pdf/141/msm-141-pmug.pdf (last accessed Sep. 11, 2024). (Year: 2014).*

*Primary Examiner* — Florian M Zeender
*Assistant Examiner* — Kimberly S. Bursum
(74) *Attorney, Agent, or Firm* — Merchant and Gould, PC

(57) ABSTRACT

The present application describes a system and method which may enable an enterprise to map existing planograms for a group of stores in order to facilitate a modification of an item category in a planogram for the stores. One or more planograms associated with a desired item category may be chosen, and a list of stores for the planogram(s) may be provided. From the list of stores having a common planogram allocated to the item category, a subset of stores may be chosen for which to change the planogram(s). Changes to a planogram may require the creation of a separate child planogram, in some examples. Updates to the child planograms may apply to all stores in the chosen subset of stores, to avoid a requirement of individual planogram edits.

18 Claims, 10 Drawing Sheets

(56) References Cited

U.S. PATENT DOCUMENTS

| | | |
|---|---|---|
| 2012/0022913 A1 | 1/2012 | Volkmann et al. |
| 2013/0325638 A1 | 12/2013 | Auclair et al. |
| 2013/0346262 A1 | 12/2013 | Hadden et al. |
| 2015/0073947 A1 | 3/2015 | Higgins et al. |
| 2015/0324725 A1 | 11/2015 | Roesbery et al. |
| 2017/0016643 A1* | 1/2017 | Combe .................. F24F 11/58 |

* cited by examiner

PLANOGRAM ITEM CATEGORY MODIFICATION

BACKGROUND

An enterprise with one or more brick-and-mortar stores may utilize planograms to plan the layout of items in its stores. A planogram may be utilized by one store or by multiple stores across the enterprise. In some circumstances, when the enterprise wishes to change the way a category of items is displayed (for example, by changing item orientations or by changing which items are offered for sale), it may be desired to make a similar change in some or all stores which utilize the same planogram. This may lead to inefficiencies if the planogram must be changed individually for each affected store, and timing of the change may prove difficult to track consistently. A system and method which may enable enterprise users to map existing planograms for a group of stores in order to facilitate a modification of an item category in a planogram for the group of stores may have efficiency and consistency advantages for the enterprise.

SUMMARY

In some examples, enterprise users may need to execute a transaction to change a store presentation for an item category. In some examples, store space for the item, or category of items, may not be impacted by this change (for example, changing a display method, number, layout, or arrangement of items on a shelf without changing the location of the shelf in the store or the number of shelves). In some examples, assortment-related transitions may include creating a project associated with the modification of the item category, choosing associated planograms, and choosing affected stores. In some examples, planogram-store relationships may be generated for reviewing existing planograms, reviewing store selections, storing specific item category modification strategies, creating new modified child planograms and updating planogram dates (such as start and end dates).

Accordingly, the present application describes a computing system, including at least one processor and at least one memory storing computer-executable instructions for facilitating a modification of an item category, the computer-executable instructions when executed by the at least one processor causing the computer to receive an input including the item category which is to be modified. In some examples, the instructions may also cause the computer to identify a planogram from a plurality of planograms, the planogram corresponding to the item category, where the planogram applies to a plurality of stores and select a group of stores from among the plurality of stores. The instructions may cause the computer to generate a child planogram for the group of stores (where the child planogram may have a reference to the planogram) and modify an item layout within the item category of the child planogram. In some examples, the instructions may also cause the computer to assign an end date to the planogram for the group of stores and a start date to the child planogram for the group of stores (the start date of the child planogram may correspond to the end date assigned to the planogram for the group of stores) and generate an output including the child planogram, where the child planogram applies to the group of stores and the output may be available to a planogram layout platform.

In some examples, a disclosed method may include receiving an input including the item category which is to be modified. In some examples, a planogram may be identified from a plurality of planograms, the planogram corresponding to the item category, where the planogram applies to a plurality of stores and select a group of stores from among the plurality of stores. A child planogram may be generated for the group of stores (where the child planogram may have a reference to the planogram) and an item layout may be modified within the item category of the child planogram. In some examples, an end date may be assigned to the planogram for the group of stores and a start date may be assigned to the child planogram for the group of stores (the start date of the child planogram may correspond to the end date assigned to the planogram for the group of stores). An output may be generated which may include the child planogram, where the child planogram applies to the group of stores and the output may be available to a planogram layout platform.

In some examples, a disclosed system may include a store assignment platform including a first computer system configured to receive an input including the item category which is to be modified. In some examples, first computer system may be configured to identify a planogram from a plurality of planograms, the planogram corresponding to the item category, where the planogram applies to a plurality of stores. In some examples, the disclosed system may include a layout plan strategy platform, executing on a second computer system communicatively connected to the first computer system, instructions to select a group of stores from among the plurality of stores. The instructions may cause the layout plan strategy platform to generate a child planogram for the group of stores (where the child planogram may have a reference to the planogram) and modify an item layout within the item category of the child planogram. In some examples, the instructions may also cause the layout plan strategy platform to assign an end date to the planogram for the group of stores and a start date to the child planogram for the group of stores (the start date of the child planogram may correspond to the end date assigned to the planogram for the group of stores) and generate an output including the child planogram, where the child planogram applies to the group of stores and the output may be available to a planogram layout platform.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
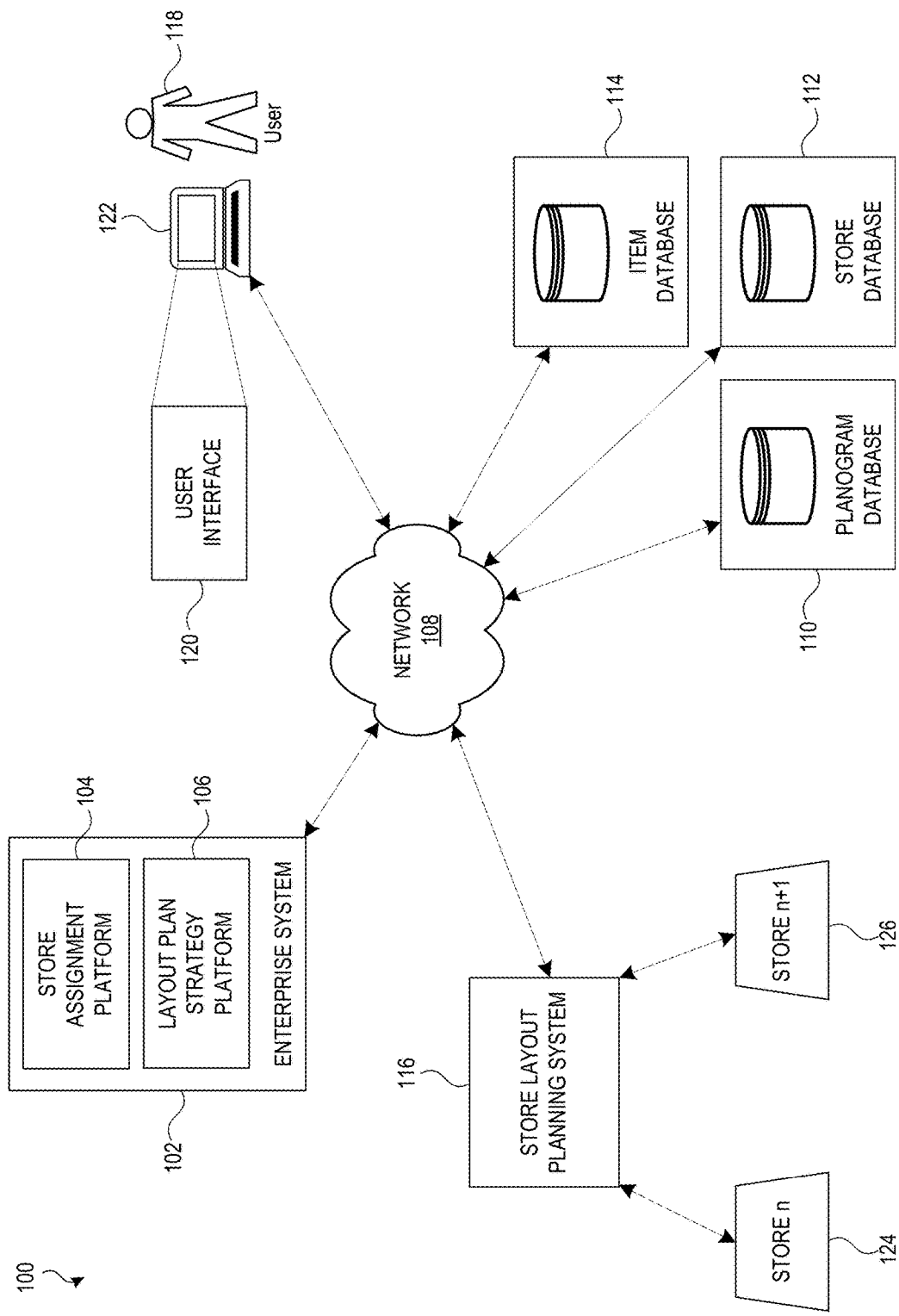
FIG. 1 illustrates an example system for facilitating a modification of an item category of a planogram, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An enterprise with one or more brick-and-mortar stores may utilize planograms to plan the layout of items in its stores. A planogram may relate to an entire store, a portion of a store, one display of a store (for example, one shelf, rack, or table), or a portion of a display. A planogram may be utilized by one store or by multiple stores across the enterprise. In some circumstances, when the enterprise wishes to change the way a category of items is displayed (for example, by changing item orientations or by changing which items are offered for sale), it may be desired to make a similar change in multiple stores which utilize the same planogram but not to all stores which utilize the planogram. This may lead to inefficiencies if the planogram must be changed individually for each affected store, and timing of the change may prove difficult to track consistently. A system and method which may enable enterprise users to map existing planograms for a group of stores in order to facilitate a modification of an item category in a planogram for the group of stores may have efficiency and consistency advantages for the enterprise.

In examples, a user may first select an item category (e.g. "chips" or "cat sweaters") of relevant merchandise. One or more planograms associated with that category may then be chosen. A list of stores and locations for the planogram(s) may be provided to the user. For example, a first subset of stores may have a reserved space for "chips" having a first size, and a second subset of stores may have a second, differently-sized space for "chips". From the list of stores having a common planogram and space allocated to the item category, stores may be chosen for which to change the planogram(s). Changes to a planogram may require the creation of a separate child planogram which, in some examples, may have a start date after the parent planogram at the same store, and in other examples which may run concurrently with its parent planogram for a duration of time at different stores. Planograms which are to be updated may be made available for a planogram editor, and updates may apply to all stores in the chosen subset of stores, to avoid a requirement of individual planogram edits.

In some examples, these methods and systems may allow employee users to more efficiently manage relationships of item categories and their associated planograms over time at different stores against expectations of a high degree of accuracy. For example, by allowing for parent-child planogram relationships, and allowing users to set effective dates for new planograms while automating changeover between planograms, a smooth transition of changes in item layout may be defined in advance. This allows an enterprise to plan and prepare adequately for the change, and ensures no gaps in planogram application dates at any one or more stores. Furthermore, consistency across multiple similarly-laid out stores may be ensured, while at the same time providing simplicity to the enterprise user by avoiding that user having to repeatedly, manually modify each planogram for each store.

In some examples, these methods and systems may automate the management and visibility of gaps and overlaps in planograms and facilitate efficient planogram modifications. This may increase efficiency in various situations, for example where: an item category currently in all stores may have been executed by different project transitions (each project transition handling a subset of stores); an item category currently may have unique set dates and discontinue dates by store; an item category currently may occupy a different number of sales floor locations currently as compared to the past or future; or a sales floor location occupied by an item category may be replaced by another item category.

These and other examples will be explained in more detail below with respect to FIG. 1-FIG. 10.

FIG. 1 illustrates an example system 100 for facilitating a modification of an item category of a planogram, according to an example. As will be described in more detail below, the system 100 may include an enterprise system 102, a store assignment platform 104, a layout plan strategy platform 106, a network 108, a planogram database 110, a store database 112, an item database 114, a store layout planning system 116, user 118, user interface 120, device 112, and multiple enterprise stores, represented by store n 124 and store n+1 126.

In an example, enterprise system 102 (including store assignment platform 104 and/or layout plan strategy platform 106) may receive input data from (or provide output data to) planogram database 110, store database 112, item database 114, user 118 (in some examples, via user interface 120), and/or store layout planning system 116. Enterprise system 102 may include sub-processors, tools, and services, to aid in the intake, processing, analysis, and display of the data and inputs, as will be discussed herein. The various input (or output) data may be communicated to enterprise system 102 (including store assignment platform 104 and/or layout plan strategy platform 106) via network 108.

In some examples, as described herein, network 108 may include a computer network, an enterprise intranet, the Internet, a LAN, a Wide Area Network (WAN), wireless transmission mediums, wired transmission mediums, other networks, and combinations thereof. Although network 108 is shown as a single network in FIG. 1, this is shown as an example and the various communications described herein may occur over the same network or a number of different networks.

In some examples, one or all of planogram database 110, store database 112, item database 114, and store layout planning system 116 may be within enterprise system 102; in some examples one or all of them may be external to enterprise system 102. In some examples, database or data storage as used herein may refer to one or more various databases internal to the enterprise or external to the enterprise, which may be virtual (e.g. cloud-based) in some examples; in some examples, they may network or drive-based.

In some examples, planogram database 110 may store planograms and relationship data which may define relationships between stores and planograms. In some examples, this may include which stores utilize or are associated with which planograms, which planograms are associated with or utilized by which types or formats of stores, which item categories may be associated with which planograms and which stores, or other planogram-related data. In some examples, as used herein, an item category may contain one product item or multiple product items. In some examples, store database 112, may store a listing of stores, store types, store locations, store formats, store attributes, store item inventories, and other store-related data. In some examples, item database 114 may include a listing of items and item categories to be assigned into planograms, characteristics/attributes of items/item categories (including size, shape, weight, dimensions, storage requirements (e.g. refrigerated, dry, frozen)), item classifications (e.g. produce, toys, clothing, electronics), or other item-related data.

In some examples, upon receiving input data, enterprise system 102 (including one or both of: store assignment platform 104 and layout plan strategy platform 106) can identify a planogram corresponding to an item category which is to be modified, generate a child planogram, and facilitate modification of the selected planogram or child planogram, or both. The planogram may be one of multiple planograms of an enterprise, which may be a retail enterprise. In some examples, the steps and results of the identification, generation, modification, and other processes performed by enterprise system 102 (including one or both of: store assignment platform 104 and layout plan strategy platform 106) may be included in outputs generated for display and/or user interaction on user interface 120, which may be displayed to user 118 on device 122. In some examples, as described herein, the device 122 may be a desktop computer, a laptop computer, a tablet, a cell phone, a smart TV, a smart wearable device, or other appropriate electronic device which is capable of displaying the user interface 120. In an example, user 118 is an employee, operator, manager, or other agent of the enterprise. In an example, user interface 120 is a web application. In other examples, user interface 120 is generated by a device application. In some examples, user interface 120 allows user 118 to interact with displayed tables, graphs, lists, or other appropriate display means based on user 118's needs and preferences (for example, selecting, filtering, sorting, customizing views and charts, or toggling different options on and off).

In some examples, store layout planning system 116 may receive planogram and/or item data (for example, a modified planogram) from enterprise system 102, planogram database 110, store database 112, and/or item database 114. In some examples, store layout planning system may create planogram schematics which may show the layout, number, and/or orientation of items in a store. For example, store layout planning system 116 may receive a new child planogram generated from enterprise system 102, and may update a planogram schematic which may show that the location and orientation of an item category in a store display (for example, a shelving unit, a table, a hanging rack, etc.) has changed from the original (parent) planogram, or that the selection of item categories to be presented in the store display has changed. In some examples, this modified planogram schematic may be stored in the store layout planning system 116 or the planogram database 110. In some examples, this modified planogram schematic may be sent to one or more stores, such as store n 124 and store n+1 126, which make use of the planogram. Enterprise employees at store n 124 and store n+1 126 may then make use of this planogram, and may make necessary preparations to make the modifications to the store layout for the item category as shown in the modified planogram schematic ahead of the modified planogram start date. In some examples, store n 124 and store n+1 126 may be of the same or different types, the same or different sizes, have the same or different layouts, and be of the same or different categories.

Figure 2:
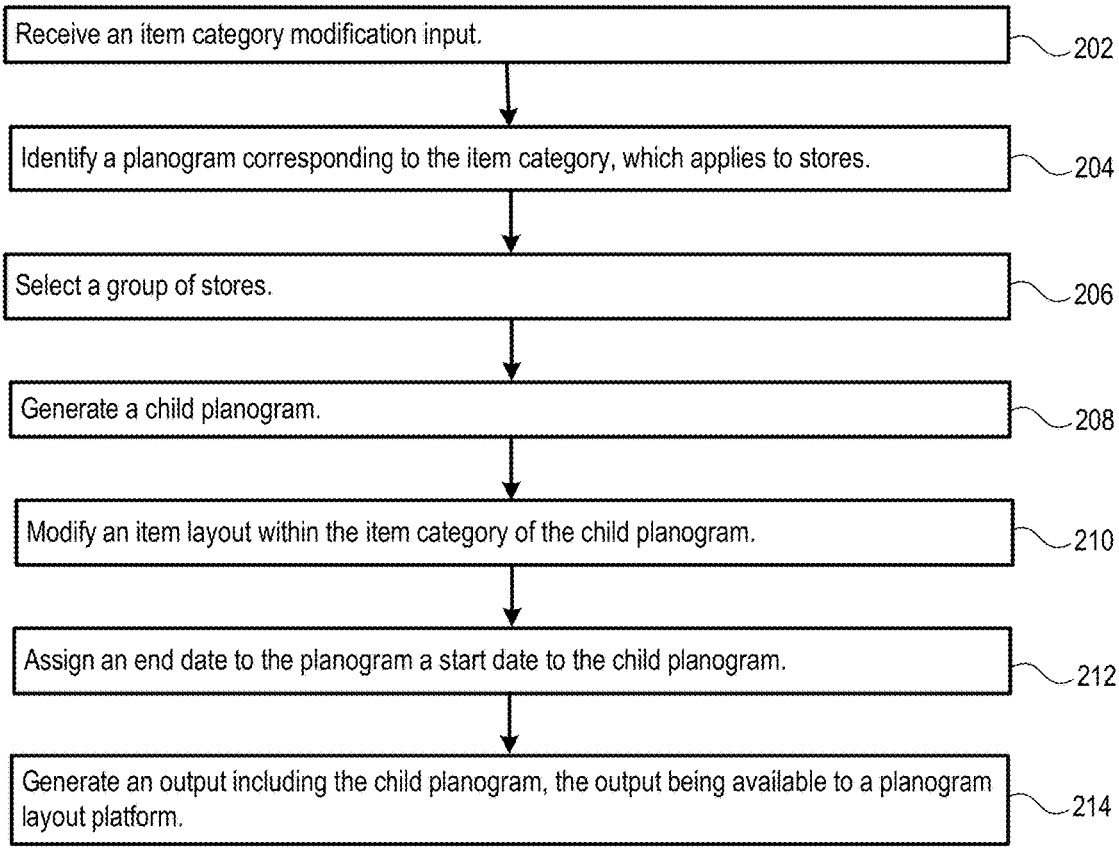
FIG. 2 illustrates an example method for facilitating a modification of an item category of a planogram, according to an example.

FIG. 2 illustrates an example method 200 for facilitating a modification of an item category of a planogram, according to an example. The method 200 may be performed by one or more computing devices and/or platforms of the system 100 shown and described with respect to FIG. 1.

Method 200 begins at step 202 with a computing system, such as enterprise system 102, receiving an item category modification input. In some examples, the item category modification input may include an item category which is to be modified. In some examples, an item category may include one item (for example, a good or product for sale in a retail or grocery store) or multiple items. In some examples, the item category input may be received from a user (for example, through means of a user interface), a database, and application, or another computing system, for example received at enterprise system 102 in response to receipt of an input at device 122 from user 118.

In some examples, at step 204, a planogram corresponding to the item category, which applies to stores, may be identified. In some examples, a planogram may apply to multiple (a plurality of) stores and may dictate how the item category is to be displayed in those stores (e.g., the shelf assignment, horizontal space allocated, etc.). The planogram may be identified by the enterprise system 102, for example based on information in planogram database 110 tying the planogram to the item category previously selected.

In some examples, at step 206, a group of stores may be selected. In some examples, the group of stores are selected from the plurality of stores associated with the identified planogram. In some examples, these selected group of stores are the stores in which the item category's display, as defined by the applicable planogram, will be modified. In some examples, the group of stores may include one, two, or more stores.

In some examples, at step 208, a child planogram may be generated. In some examples, the child planogram is generated for the selected group of stores, and the child planogram may have a reference back to the original planogram from which it was created, which may then be known as a parent planogram. In some examples, each planogram is given a planogram ID, which may be a combination of letters and numbers. In some examples, the planogram ID of a child planogram may allow for an easy reference to its parent planogram; for example, a parent planogram may have a planogram ID of a number and a letter, and the related child planogram may have a planogram ID of the same number and a different letter. In some examples, the parent planogram and the child planogram may represent the same physical space within the plurality of stores, and the child planogram and the planogram may each represent a different item layout within the physical space, and be applicable to the space at different times.

In some examples, at step 210, an item layout may be modified within the item category of the child planogram. In some examples, modification of the (item layout within the) item category may include modification of the layout, orientation, or location of items of the item category in a display area of a store (for example, merchandise shelving, bins, baskets, tables, hanging racks, coolers, freezers, or other appropriate merchandise displays). In some examples, modification of the item category may include removing one item category and replacing it with another. In some examples, modification of the item category does not require increasing or decreasing the amount of physical space allocated to the planograms. In some examples, modification of the item category does not require the movement or relocation of the display areas (shelving units, etc.) of the store.

In some examples, at step 212, an end date may be assigned to the (parent) planogram and a start date may be assigned to the child planogram. In some examples, the start date of the child planogram may correspond to the end date assigned to the parent planogram for the same stores to which the child planogram applies. In some examples, the (parent) planogram may remain applicable to a remainder of the plurality of stores after the start date of the child planogram, where this remaining plurality does not contain the group of stores to which the child planogram will apply to after the start date of the child planogram.

In some examples, it may be identified that there is a gap in time between the end date assigned to the planogram for the group of stores and the start data to the child planogram for the group of stores, where the gap in time causes neither the planogram nor the child planogram to be applicable to the group of stores for the gap in time. In some examples, either the end date assigned to the planogram for the group of stores or the start data to the child planogram for the group of stores may be corrected to remove the gap in time. In some examples, the computing system may automatically make this correction. In some examples, a user may make this correction via a user interface. In some examples, it may be identified that there is an overlap in time between the end date assigned to the planogram for the group of stores and the start data to the child planogram for the group of stores, where the overlap in time causes both the planogram and the child planogram to be applicable to the group of stores for the overlap in time. In some examples, either the end date assigned to the planogram for the group of stores or the start date of the child planogram for the group of stores may be corrected to remove the overlap in time. In some examples, the computing system may automatically make this correction. In some examples, a user may make this correction via a user interface.

In some examples, at step 214, an output may be generated which may include the child planogram, and which may be available to a planogram layout platform (for example, a store layout planning system). In some examples, the child planogram applies to the selected group of stores. In some examples, the output may be displayed in a user interface such as user interface 120, on a device such as device 122, to a user such as user 118 (refer to FIG. 1). In some examples, the planogram layout platform may create planogram schematics which may show the layout, number, and/or orientation of items in the associated stores as a planogram visual display which may include the child planogram. In some examples, the modified planogram schematic may be sent to one or more of the stores which make use of the planogram. Enterprise employees at the stores may then utilize this planogram, and may make necessary preparations to make the modifications to the store layout for the item category as shown in the modified planogram schematic ahead of the child planogram start date. In some examples, the generation of the child planogram which applies across the group of stores, avoids a need for creating a multitude of alternate child planograms, each of the multitude of alternate child planograms applying to each store of the group of stores.

In some examples, the child planogram may be exported to a second computing system (for example, a second computing system communicatively connected to the first), wherein the second computing system is in communication with an enterprise floor planning system, and where the enterprise floor planning division utilizes the child planogram to instruct enterprise floor personnel regarding the item layout of items to be located and displayed in display areas of the group of stores associated with the child planogram. In some examples, both the first and second computing systems may be within the same enterprise (for example, a retail or grocery enterprise).

In some examples, the computing system may receive a second input including a second item category which is to be modified. The child planogram may be identified as the planogram which corresponds to that second item category. In some examples, a subgroup of the stores that are associated with the child planogram may be selected, and a second child planogram may be generated. In some examples, the second child planogram may have a reference to the child planogram (for example, the child planogram may be the parent of the second child planogram). In some examples, a second item layout within the second item category of the second child planogram may be modified. In some examples, an end date may be assigned to the child planogram for the subgroup of stores and a start date may be assigned to the second child planogram for the subgroup of stores, where the start date of the second child planogram may correspond to the end date assigned to the child planogram for the subgroup of stores. In some examples, a second output may be generated, including the second child planogram, where the second child planogram applies to the subgroup of stores. In some examples, the second output may available to the planogram layout platform.

In some examples, the steps of method 200 may be performed by a single system. In some examples, the steps of method 200 may be performed by different systems within an enterprise. For example, step 202 and 204 may be performed by a computing system such as store assignment platform 104), and steps 206 through 214 may be performed by a computing system such as layout plan strategy platform 106 (reference FIG. 1).

Figure 3:
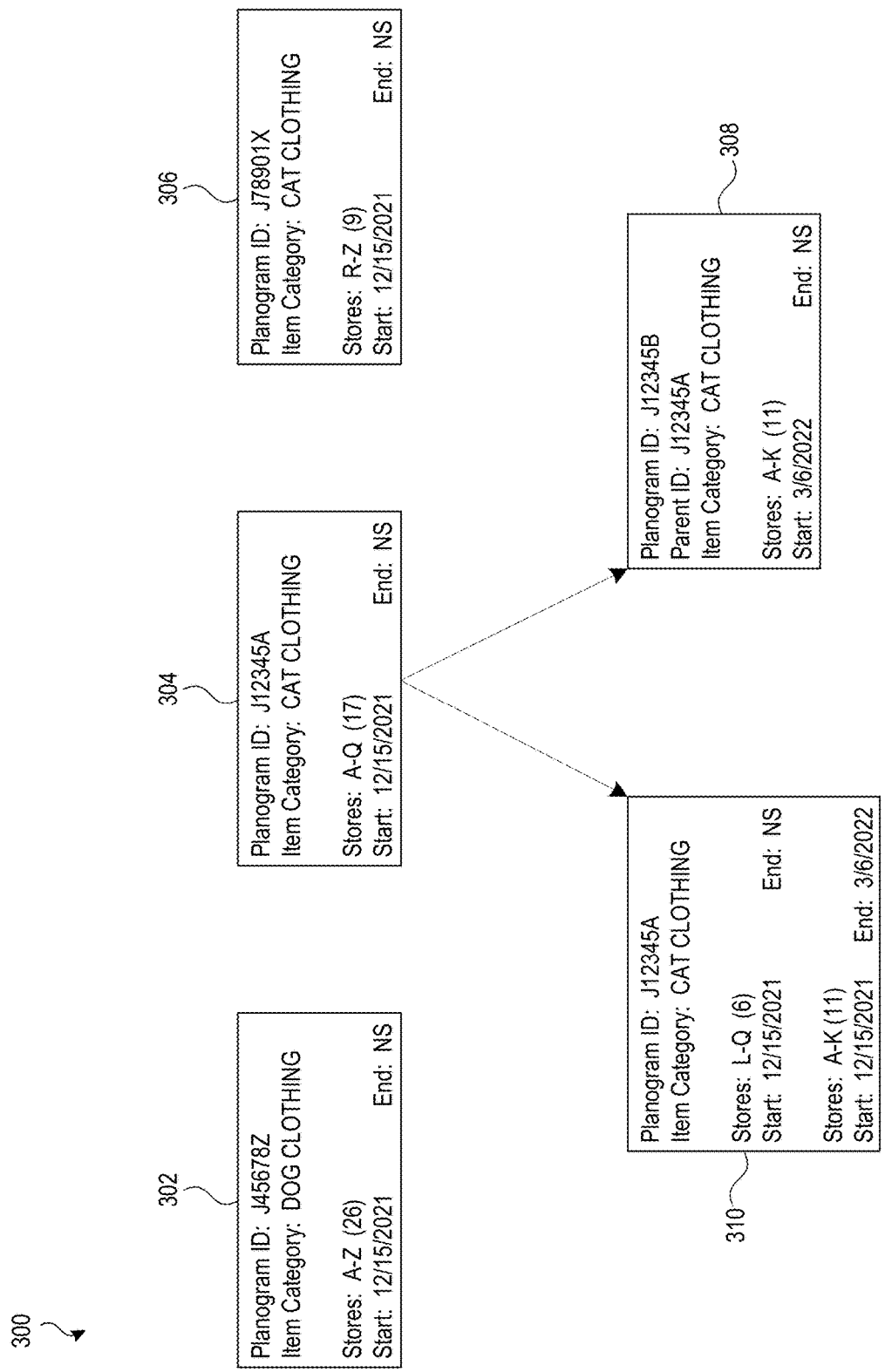
FIG. 3 illustrates an example of a group of planograms of an enterprise and example item category modifications of a selected one of the planograms, according to an example.

FIG. 3 illustrates an example of a group of planograms of an enterprise and example item category modifications of a selected one of the planograms, according to an example. The group of planograms may exist in a system such as system 100. In some examples, Planogram J45687Z 302, Planogram J12345A 304, and Planogram J78901X 306 may all exist in the system of an enterprise. In some examples, each may have a corresponding item category, a planogram ID, applicable stores, a start date, and an end date, which may be set as "not specified" if the planogram is intended to apply until it is modified to no longer apply. For example, a planogram may benefit from having an end date of "not specified" if it is related to an item category which is usually offered for sale (for example, "women's shampoo"). In some examples, a planogram may benefit from having an end date of a specified date, if it is related to an item category which is offered for sale for a limited time (for example, "summer outdoor patio furniture," "Christmas decorations," or "Valentine's Day greeting cards").

In an example, an input may be received that it is desired to modify an item category of "cat clothing" for an enterprise which has stores A through Z (one of skill in the art will appreciate that although "cat clothing" is the example used in this example, any item category for any good or product may be modified), and the modification is to be for stores A through K. In this example, Planogram J45687Z 302 will not be chosen because it applies to item category "dog clothing," and Planogram J78901X 306 will not be chosen because although it applies to item category "cat clothing," it only applies to stores R through Z. In this example, Planogram J12345A 304 will be identified as the planogram applying to item category "cat clothing" which is to be modified, and it applies to stores A through Q.

In this example, a child planogram may be created, and may be given a planogram ID which references the parent planogram. In this example, Child Planogram J12345B 308 may be created, in which the item "cat clothing" is to be modified. In this example, a start date will be assigned to Child Planogram J12345B 308 (of Mar. 6, 2022) on which it will apply to stores A through K. In this example, (parent) Updated Planogram J12345A 310 may have an end date assigned to it for stores A through K (of Mar. 6, 2022). In this example, (parent) Updated Planogram J12345A 310 may retain its original end date ("not specified," in this example) for stores L through Q, to which it will remain applicable because Child Planogram J12345B 308 will be applicable to.

In some examples, when Child Planogram J12345B 308 is created, a Twin Child Planogram J12345C may also be created. In some examples, the Twin Child Planogram J12345C will be identical to Planogram J12345A 304 (will not have its item category modified), and will be given the same start date as Child Planogram J12345B 308. In some examples, Planogram J12345A 304 will be assigned an end date equal to the start dates of both Child Planogram J12345B 308 and Twin Child Planogram J12345C and will end (cease to apply to any stores when they take affect), and Child Planogram J12345B 308 will then apply to stores A through K and Twin Child Planogram J12345C will apply to stores L through Q.

Figure 4:
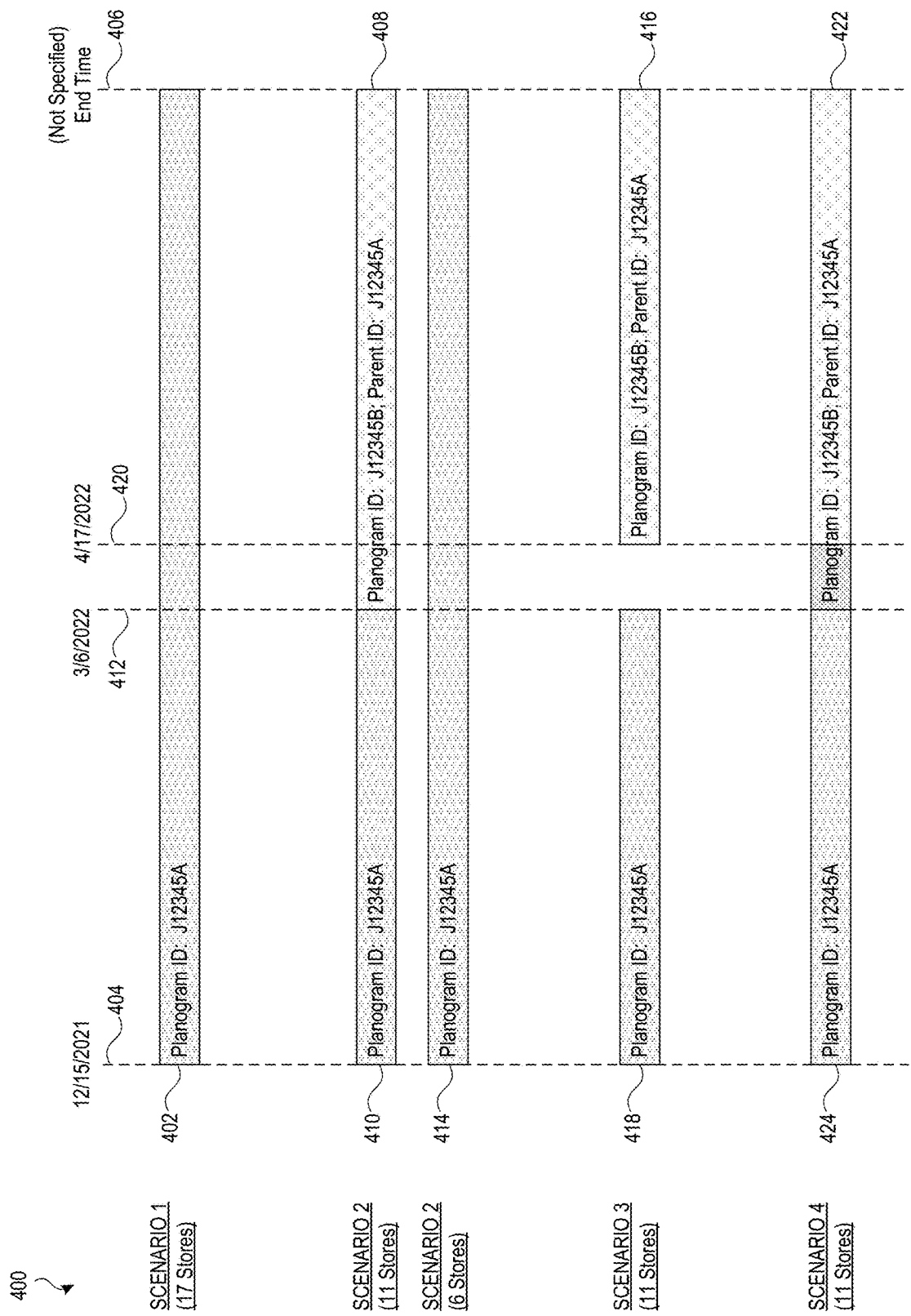
FIG. 4 illustrates an example timeline associated a planogram of an enterprise and example timelines associated with item category modifications of the planogram, according to an example.

FIG. 4 illustrates an example timeline associated with planogram applicability within an enterprise, and example timelines associated with item category modifications of the planogram. In an example, in Scenario 1, Planogram J12345A 402 exists in a system, applies to seventeen stores, has an assigned start date (for example, Dec. 15, 2021 404), and has an assigned end date (which may be specified or not specified).

In an example, in Scenario 2, the item category to which Planogram J12345A 402 corresponds is to be modified for eleven of the seventeen stores. In this example, Child Planogram J12345B 408 may be created, in which the item category is to be modified. In this example, a start date may be assigned to Child Planogram J12345B 408 (for example, Mar. 6, 2022 412), at which Child Planogram J12345B 408 will apply to the eleven desired stores. In this example, (parent) Updated Planogram J12345A 410 may have an end date assigned to it for the remaining six of the seventeen stores (for example, Mar. 6, 2022 412). In this example, (parent) Updated Planogram J12345A 414 may retain its original end date (not specified 406, in this example) for the remaining six stores, to which it will remain applicable.

In an example, in Scenario 2, the end date of Planogram ID J12345A 410 and Child Planogram J12345B 408 may be assigned so that there is no gap (a period in time in which no planogram applies to a specific display area of a store) or overlap (a period of time where multiple planograms apply to a specific display area of a store) between the application of the two planograms to any store. In some examples, when either the end date of Planogram ID J12345A 410 and Child Planogram J12345B 408 are assigned, the other is automatically set to be equal to or starting immediately adjacent to the assigned date.

In some examples, when Child Planogram J12345B 408 is created, a Twin Child Planogram J12345C may also be created. In some examples, the Twin Child Planogram J12345C may be identical to Planogram J12345A 414 (will not have its item category modified), and will be given the same start date as Child Planogram J12345B 408. In some examples, Planogram J12345A 410 will be assigned an end date equal to the start dates of both Child Planogram J12345B 408 and Twin Child Planogram J12345C and upon that end date (cease to apply to any stores when they take affect) Child Planogram J12345B 408 will then apply to the eleven stores and Twin Child Planogram J12345C will apply to the remaining seven stores.

In Scenario 3, Child Planogram J12345B 416 may be created. In an example, it is detected that there is a gap between the end date of Planogram ID J12345A 418 and Child Planogram J12345B 416 (for example, between Mar. 6, 2022 412 and Apr. 17, 2022 420). During this gap, no planogram applies to a specific display area of a store. In some examples, to remedy this, either the end date of Planogram ID J12345A 418 or the Child Planogram J12345B 416 may be edited to align with one another to remove the gap in applicability (to more closely resemble Planogram ID J12345A 410 and Child Planogram J12345B 408 of Scenario 2, for example).

In Scenario 4, Child Planogram J12345B 422 may be created. In an example, it is detected that there is an overlap of the end date of Planogram ID J12345A 422 and Child Planogram J12345B 424 (for example, between Mar. 6, 2022 412 and Apr. 17, 2022 420). During this gap, both planograms apply to a specific display area of a store. In some examples, to remedy this, either the end date of Planogram ID J12345A 424 or the Child Planogram J12345B 422 may be edited to align with one another to remove the overlap in applicability (to more closely resemble Planogram ID J12345A 410 and Child Planogram J12345B 408 of Scenario 2, for example).

In some examples, when a gap or overlap is discovered, an alert or notice may be displayed or otherwise communicated to an enterprise user. In some examples, when a gap or overlap is discovered, dates of the parent and/or child planograms may be automatically changed by one or more enterprise systems to remove the gap or overlap. In such examples, a start date of a child planogram may be controlling, and the end date of a parent planogram may be adjusted to coincide with the start date of the child planogram. In other examples, the end date of the parent planogram may be controlling, with the start date of any child or twin child planograms adjusted to coincide with such an end date. In some examples, the enterprise user may view start/end dates in a user interface, and may edit/adjust the dates to eliminate a gap or overlap.

Figure 5:
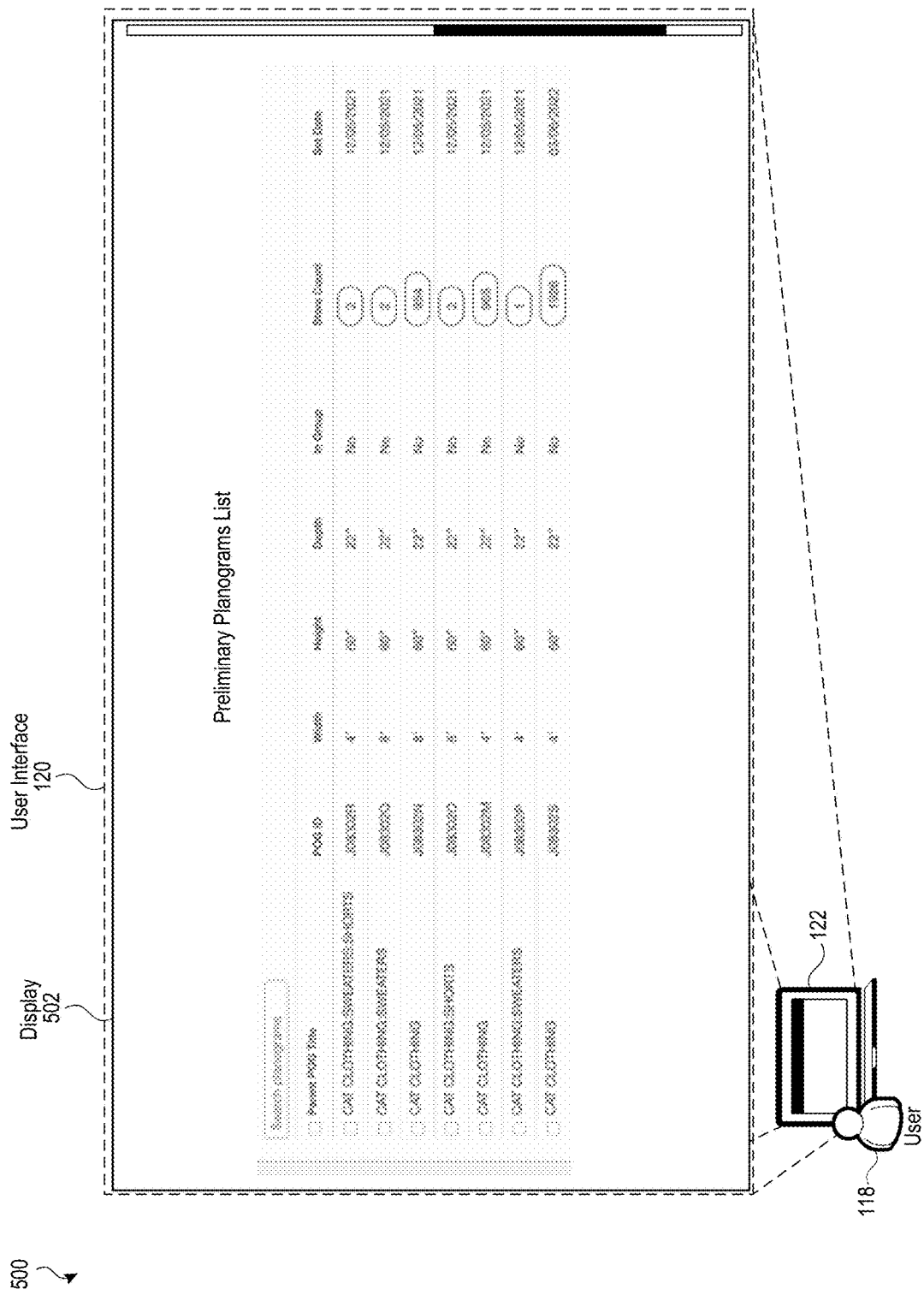
FIG. 5 illustrates an example display depicting a preliminary planograms list associated with an item category, according to an example.

FIG. 5 illustrates an example display a preliminary planograms list associated with an item category. The system 500 may include user interface 120, which may comprise display 502, and may be displayed via device 122 to user 118.

In some examples, display 502 includes a table or chart depicting planograms of an enterprise. In some examples, each planogram listing may include a title (for example, a title which corresponds to the planogram's associated item category), a planogram ID, dimensions of the physical space in one or more stores that the planogram occupies, a group, a start or set date, a store count (for example, a number of stores to which the planogram applies), and other relevant planogram information. In some examples, user 118 may interact with display 502 via user interface 120 on device 122. In some examples, display 502 may include a search function by which user 118 may search for a specific planogram, for example, by item category. In some examples, user 118 may search for a list of planograms which correspond to a specific item category which is to be modified (for example, "cat clothing").

Figure 6:
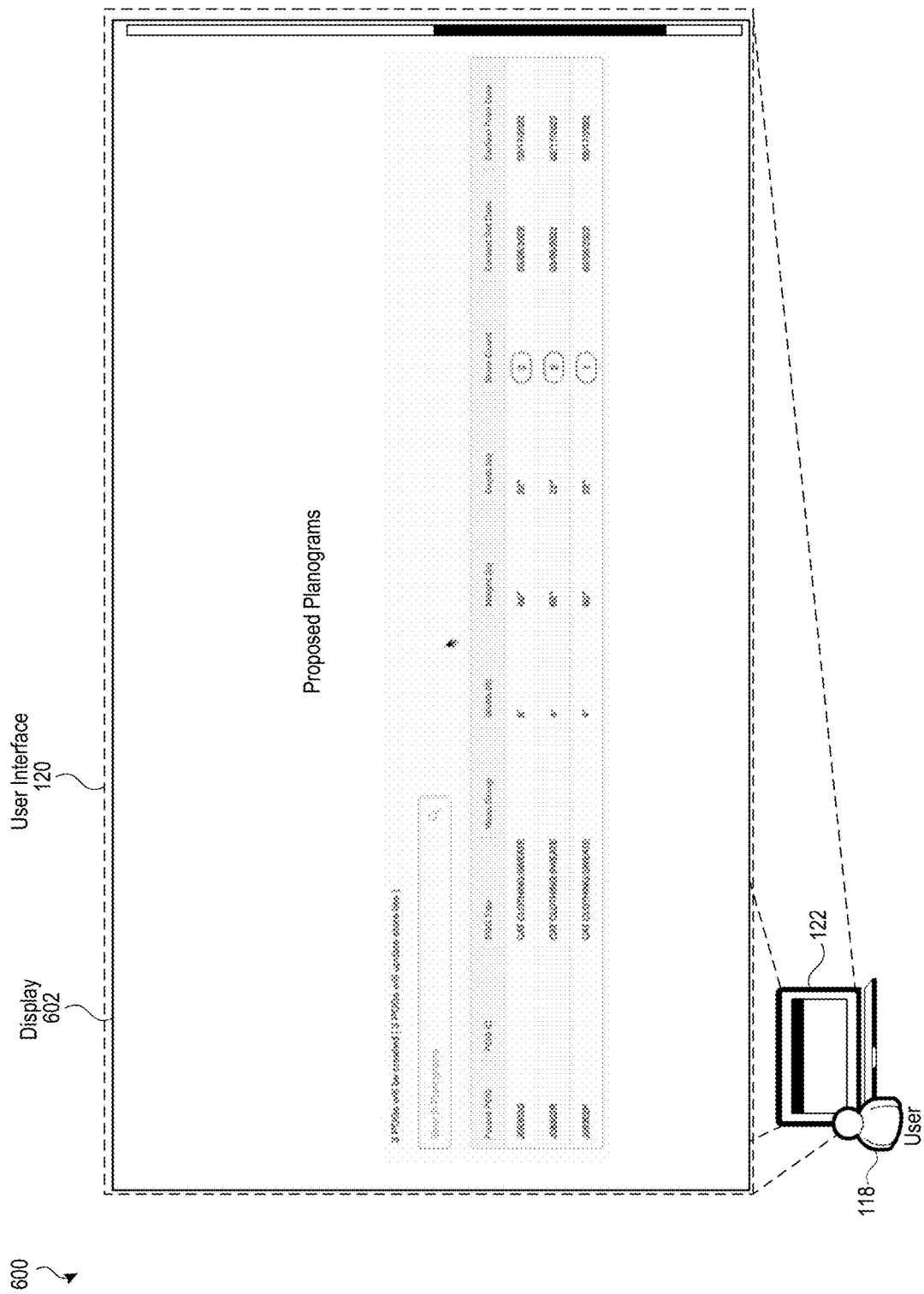
FIG. 6 illustrates an example display depicting a proposed planograms list associated with an item category which is to be modified, according to an example.

FIG. 6 illustrates an example display depicting a proposed planograms list associated with an item category which is to be modified, according to an example. The system 600 may include user interface 120, which may comprise display 602, and may be displayed via device 122 to user 118.

In some examples, display 602 includes a table or chart depicting planograms of an enterprise which correspond to a selected item category, and which have been selected for editing, modification, and/or the creation of a child planogram. In some examples, user 118 may interact with display 602 via user interface 120 on device 122. In some examples, display 602 may include a search function by which user 118 may search for a specific planogram, for example, by item category or other attribute. In some examples, display 602 may indicate how many proposed child planograms may be created.

Figure 7:
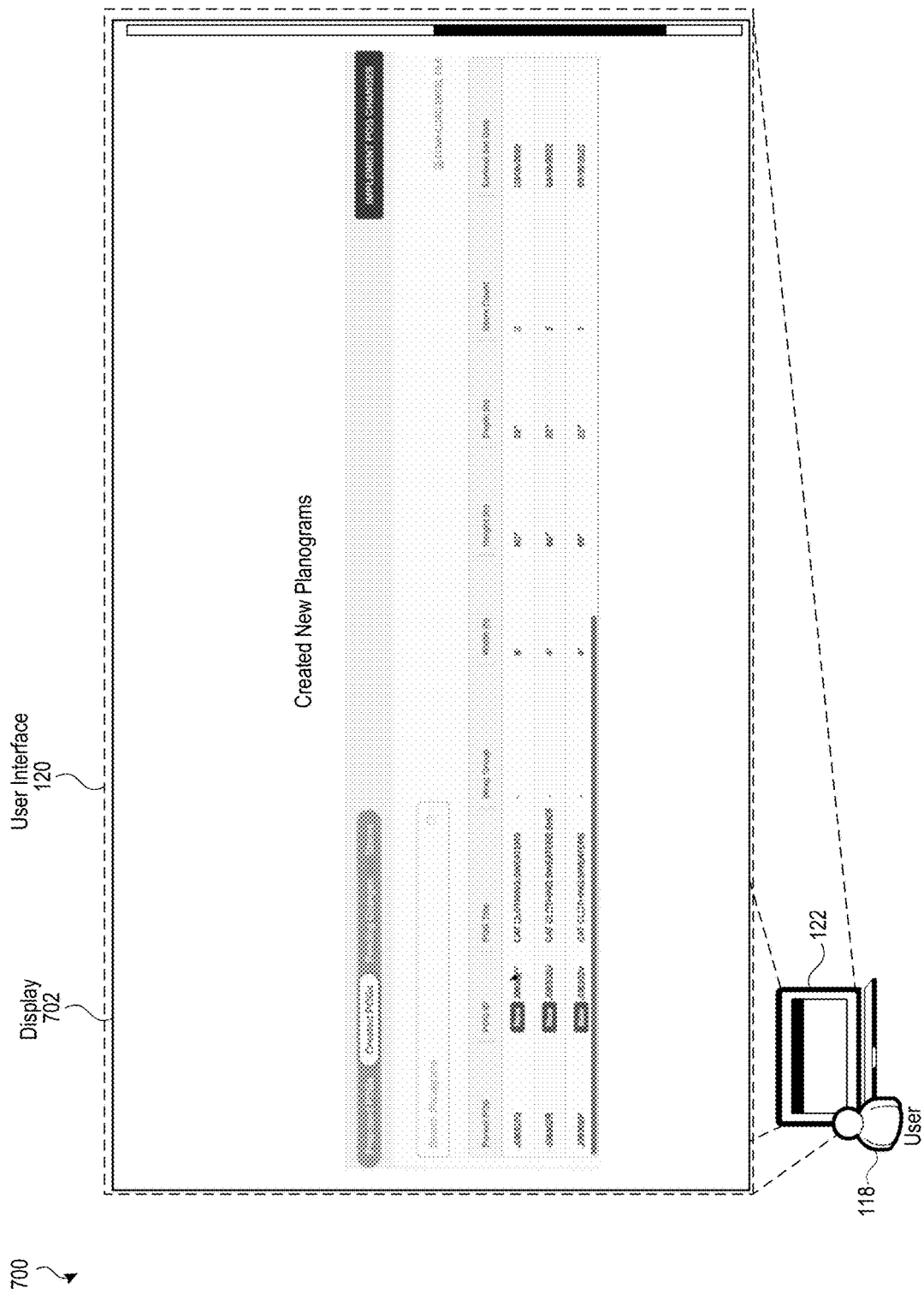
FIG. 7 illustrates an example display depicting a created new planograms list associated with an item category which is to be modified, according to an example.

FIG. 7 illustrates an example display depicting a created new planograms list associated with an item category which is to be modified, according to an example. The system 700 may include user interface 120, which may comprise display 702, and may be displayed via device 122 to user 118.

In some examples, display 702 includes a table or chart depicting newly created child planograms of an enterprise which correspond to a selected item category. In some examples, each child planogram listing may include a title (for example, a title which corresponds to the planogram's associated item category), a planogram ID, a reference to a parent planogram ID, dimensions of the physical space in one or more stores that the planogram occupies, a group, an earliest start or set date, a store count (for example, a number of stores to which the child planogram applies), and other relevant planogram information. In some examples, user 118 may interact with display 702 via user interface 120 on device 122. In some examples, display 702 may include a search function by which user 118 may search for a specific planogram, for example, by item category or other attribute. In some examples, display 702 may indicate how many proposed child planograms may be created. In some examples, the data contained in the display may be downloaded via in a spreadsheet format or to another desktop or cloud-based application, for viewing and interaction on device 122. In some examples, display 702 may enable user 118 to implement modifications/changes to item categories of the desired planograms.

Figure 8:
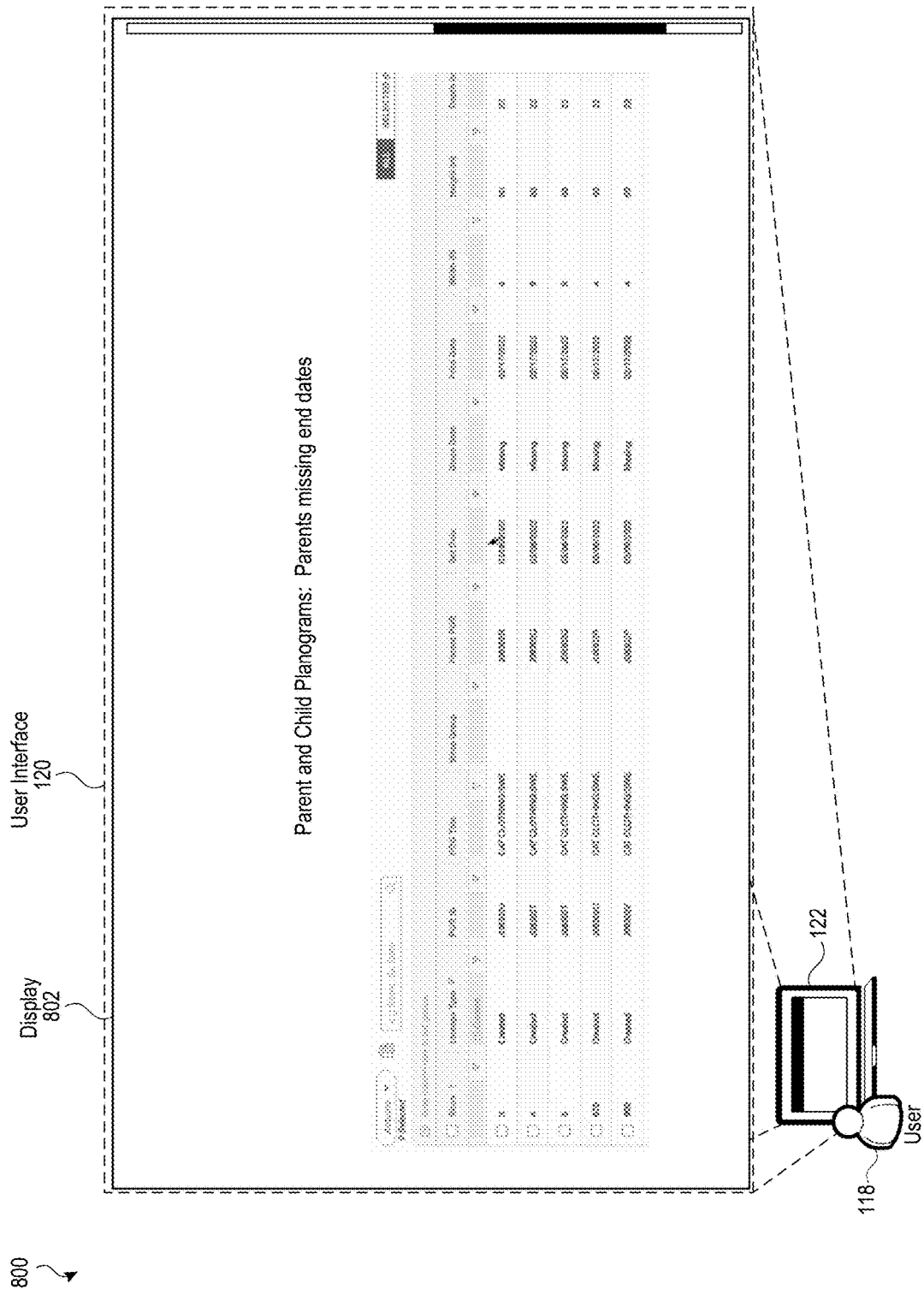
FIG. 8 illustrates an example display depicting a list demonstrating a relationship between parent and child planograms, where parent planograms are missing end dates for at least some stores, according to an example.

FIG. 8 illustrates an example display depicting a list demonstrating a relationship between parent and child planograms, where parent planograms are missing end dates for at least some stores, according to an example The system 800 may include user interface 120, which may comprise display 802, and may be displayed via device 122 to user 118.

In some examples, display 802 includes a table or chart depicting newly created child planograms of an enterprise which correspond to a selected item category. In some examples, each child planogram listing may include a title (for example, a title which corresponds to the planogram's associated item category), a planogram ID, a reference to a parent planogram ID, dimensions of the physical space in one or more stores that the planogram occupies, a type, a start or set date, a discontinue or end date, a print date, a store count (for example, a number of stores to which the child planogram applies), and other relevant planogram information. In some examples, where child planograms have been created, child and/or parent planograms may be missing end dates. In some examples, user 118 may interact with display 802 via user interface 120 on device 122. In some examples, display 802 may include a search function by which user 118 may search for a specific planogram, for example, by store, planogram ID, or date.

Figure 9:
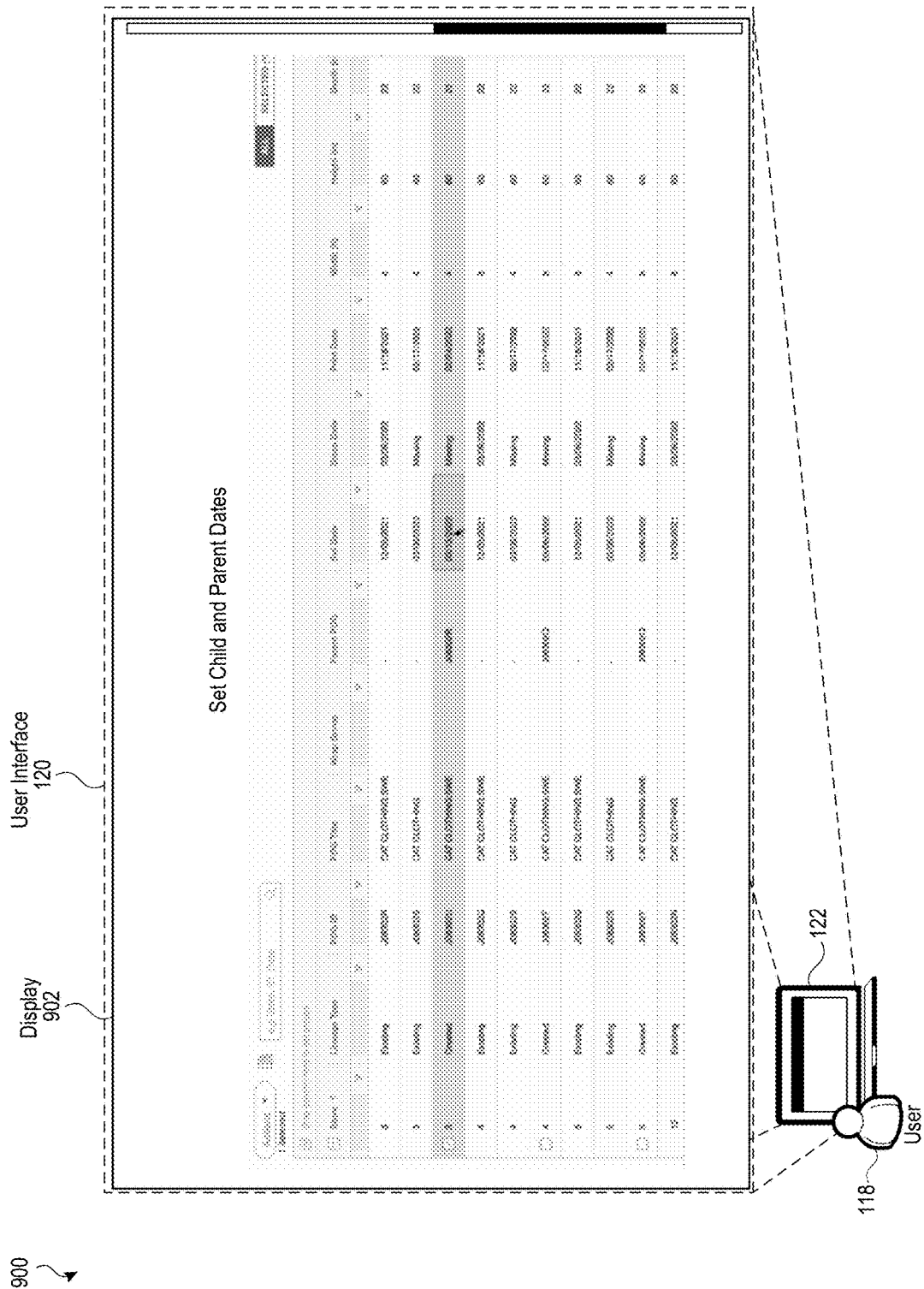
FIG. 9 illustrates an example display depicting a list of parent and child planograms, which may facilitate the setting of date for the planograms, according to an example.

FIG. 9 illustrates an example display depicting a list of parent and child planograms, which may facilitate the setting of date for the planograms, according to an example. The system 900 may include user interface 120, which may comprise display 902, and may be displayed via device 122 to user 118.

In some examples, display 802 includes a table or chart depicting (parent) planograms and newly created child planograms of an enterprise which correspond to a selected item category. In some examples, each child planogram listing may include a title (for example, a title which corresponds to the planogram's associated item category), a planogram ID, a reference to a parent planogram ID, dimensions of the physical space in one or more stores that the planogram occupies, a type, a start or set date, a discontinue or end date, a print date, a store count (for example, a number of stores to which the child planogram applies), and other relevant planogram information. In some examples, user 118 may interact with display 802 via user interface 120 on device 122. In some examples, display 802 may include a search function by which user 118 may search for a specific planogram, for example, by store, planogram ID, or date. In some examples, user 118 may interact with display 702 by selecting set dates, discontinue dates, and/or print dates which are to be assigned to a planogram.

Figure 10:
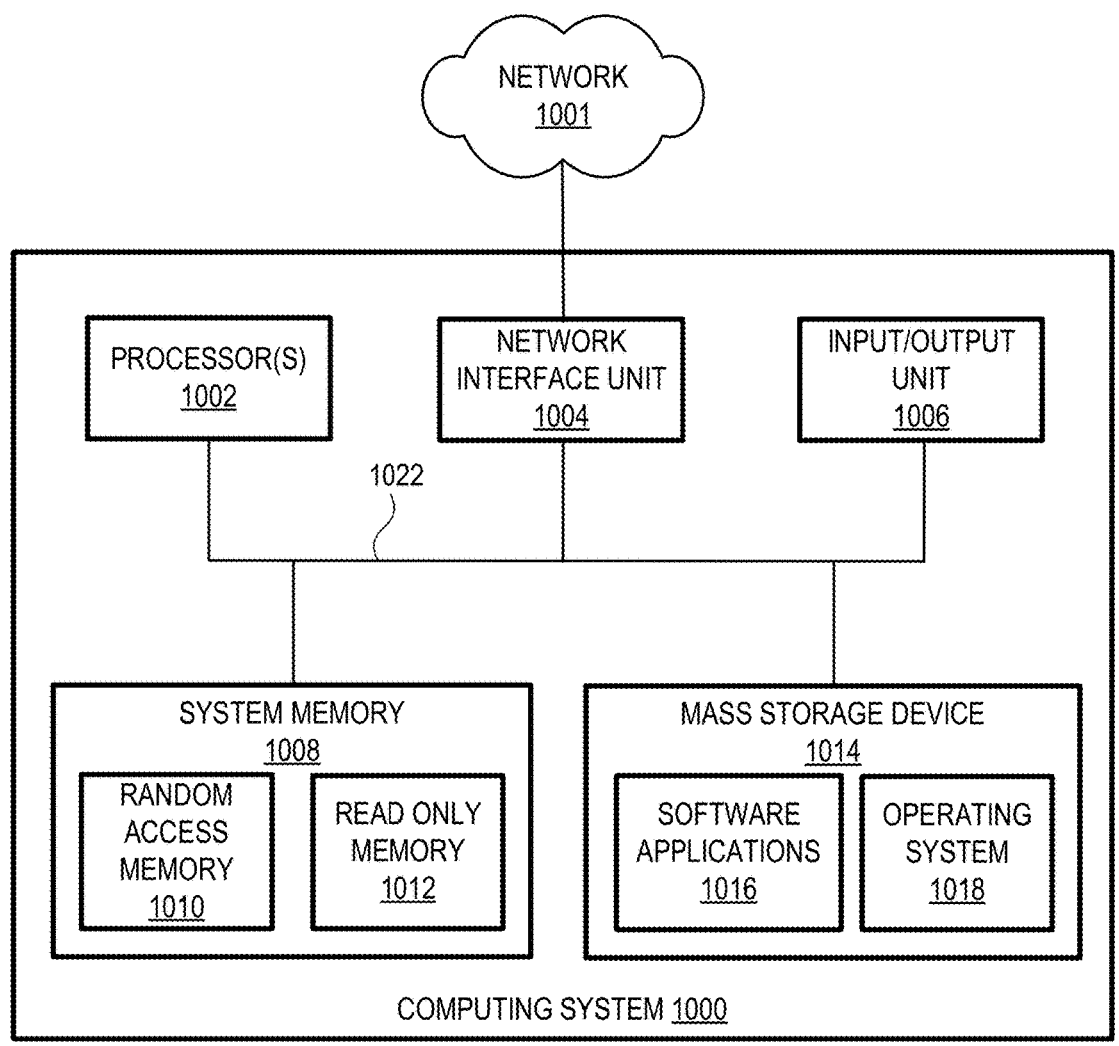
FIG. 10 illustrates an example block diagram of a computing system.

FIG. 10 illustrates an example block diagram of a virtual or physical computing system 1000. One or more aspects of the computing system 1000 can be used to implement the resource planning system 102, store instructions described herein, and preform operations described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data.

The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of modifying an item category of a planogram across multiple stores, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computing system, comprising:
   at least one processor; and
   at least one memory storing computer-executable instructions for facilitating a modification of an item category, the computer-executable instructions when executed by the at least one processor causing the computer to:
   store a parent planogram, wherein the parent planogram applies to a plurality of stores for a period of time;
   receive an input comprising the item category which is to be modified wherein the input is received from at least one of:
   a user interface;
   a database; and
   an application;
   generate a child planogram, wherein generating the child planogram comprises editing the parent planogram via use of a planogram editor;
   modify, within the item category of the child planogram, at least one of:
   item layout;
   item orientation; and
   item location;

select a group of stores from among the plurality of stores, wherein the selected group of stores are stores to which the child planogram will apply;

assign, at a layout plan strategy platform, an end date to the parent planogram for the group of stores, a start date to the child planogram for the group of stores, and an end date to the child planogram for the group of stores;

when a gap in time between the end date assigned to the parent planogram for the group of stores and the start date assigned to the child planogram for the group of stores is identified by the layout plan strategy platform, wherein the gap in time causes neither the parent planogram nor the child planogram to be applicable to the group of stores for the gap in time, automatically correct at least one of the end date assigned to the parent planogram for the group of stores and the start date assigned to the child planogram for the group of stores to remove the gap in time;

when an overlap in time between the end date assigned to the parent planogram for the group of stores and the start date assigned to the child planogram for the group of stores is identified by the layout plan strategy platform, automatically correct at least one of the end date assigned to the parent planogram for the group of stores and the start date assigned to the child planogram for the group of stores to remove the overlap in time;

generate an output to the user interface, comprising the child planogram, wherein the child planogram applies to the group of stores, the output being available to a planogram layout platform;

create, at the planogram layout platform, based on the output, a planogram visual display comprising planogram schematics, wherein the planogram schematics show at least one of the item layout, item number, and item orientation in the group of stores;

transmit the planogram schematic to one or more stores of the group of stores for utilization of the planogram schematic in modification of a layout of the one or more stores for the item category, prior to the start date assigned to the child planogram; and upon the passing of the end date assigned to the child planogram for the group of stores, automatically re-assign the parent planogram to the group of stores such that the parent planogram applies to the plurality of stores.

2. The computing system of claim 1, wherein the group of stores comprises two or more stores.

3. The computing system of claim 1, further comprising instructions to:

assign the parent planogram to remain applicable to a remainder of the plurality of stores after the start date of the child planogram, wherein the remainder does not comprise the group of stores.

4. The computing system of claim 1, further comprising instructions to export the child planogram to a second computing system, wherein the second computing system is in communication with an enterprise floor planning system, and wherein the enterprise floor planning division utilizes the child planogram to instruct enterprise floor personnel regarding the item layout of items to be located and displayed in display areas of the group of stores.

5. The computing system of claim 4, wherein the second computing system is communicatively connected to the computing system, and wherein the computing system and the second computing system are both within an enterprise.

6. The computing system of claim 1, wherein the planogram visual display includes the child planogram.

7. The computing system of claim 1, wherein the parent planogram and the child planogram represent the same physical space within the plurality of stores, and wherein the child planogram and the planogram each represent a different item layout within the physical space.

8. A method, comprising:

storing a parent planogram, wherein the parent planogram applies to a plurality of stores for a period of time;

receiving an input comprising the item category which is to be modified wherein the input is received from at least one of:
a user interface;
a database; and
an application;

generating a child planogram, wherein generating the child planogram comprises editing the parent planogram via use of a planogram editor;

modifying, within the item category of the child planogram, at least one of:
item layout;
item orientation; and
item location;

selecting a group of stores from among the plurality of stores, wherein the selected group of store are stores to which the child planogram will apply;

assigning, at a layout plan strategy platform, an end date to the parent planogram for the group of stores, a start date to the child planogram for the group of stores, and an end date to the child planograms for the group of stores;

when a gap in time between the end date assigned to the parent planogram for the group of stores and the start date assigned to the child planogram for the group of stores is identified by the layout plan strategy platform, wherein the gap in time causes neither the parent planogram nor the child planogram to be applicable to the group of stores for the gap in time, automatically correcting at least one of the end date assigned to the parent planogram for the group of stores and the start date assigned to the child planogram for the group of stores to remove the gap in time;

when an overlap in time between the end date assigned to the parent planogram for the group of stores and the start date assigned to the child planogram for the group of stores is identified by the layout plan strategy platform, automatically correcting at least one of the end date assigned to the parent planogram for the group of stores and the start date assigned to the child planogram for the group of stores to remove the overlap in time;

generating an output, to the user interface, comprising the child planogram, wherein the child planogram applies to the group of stores, the output being available to a planogram layout platform;

creating, at the planogram layout platform, based on the output, a planogram visual display comprising planogram schematics, wherein the planogram schematics show at least one of the item layout, item number, and item orientation in the group of stores;

transmitting the planogram schematic to one or more stores of the group of stores for utilization of the planogram schematic in modification of a layout of the one or more stores for the item category, prior to the start date assigned to the child planogram; and upon the passing of the end date assigned to the child planogram for the group of stores, automatically re-assigning the parent planogram to the group of stores such that the parent planogram applies to the plurality of stores.

9. The method of claim 8, further comprising:
assigning the parent planogram to remain applicable to a remainder of the plurality of stores after the start date of the child planogram, wherein the remainder does not comprise the group of stores.

10. The method of claim 8, wherein the steps of the method are performed by two or more computer systems within an enterprise.

11. The method of claim 8, wherein modifying the item layout comprises removing a first item from the child planogram and adding a second item to the child planogram.

12. The method of claim 8, wherein modifying the item layout comprises altering an orientation of an item in the child planogram.

13. The method of claim 8, further comprising:
receiving a second input comprising a second item category which is to be modified;
identifying that the child planogram corresponds to the second item category;
selecting a subgroup of stores of the plurality of stores;
generating a second child planogram having a reference to the child planogram;
modifying a second item layout within the second item category of the second child planogram;
assigning an end date to the child planogram for the subgroup of stores and a start date to the second child planogram for the subgroup of stores, wherein the start date of the second child planogram corresponds to the end date assigned to the child planogram for the subgroup of stores; and
generating a second output comprising the second child planogram, wherein the second child planogram applies to the subgroup of stores, the second output being available to the planogram layout platform.

14. A system comprising:
a store assignment platform comprising a first computer system configured to:
store a parent planogram, wherein the parent planogram applies to a plurality of stores for a period of time;
receive an input comprising the item category which is to be modified wherein the input is received from at least one of:
a user interface;
a database; and
an application;
a layout plan strategy platform, executing on a second computer system communicatively connected to the first computer system, instructions to:
generate a child planogram, wherein generating the child planogram comprises editing the parent planogram via use of a planogram editor;
modify, within the item category of the child planogram, at least one of:
item layout;
item orientation; and
item location;
select a group of stores from among the plurality of stores, wherein the selected group of stores are stores to which the child planogram will apply;

assign, at a layout strategy platform, an end date to the parent planogram for the group of stores, a start date to the child planogram for the group of stores, and an end date to the child planogram for the group of stores;

when a gap in time between the end date assigned to the parent planogram for the group of stores and the start date assigned to the child planogram for the group of stores is identified by the layout plan strategy platform, wherein the gap in time causes neither the parent planogram nor the child planogram to be applicable to the group of stores for the gap in time, automatically correct at least one of the end date assigned to the parent planogram for the group of stores and the start date assigned to the child planogram for the group of stores to remove the gap in time;

when an overlap in time between the end date assigned to the parent planogram for the group of stores and the start date assigned to the child planogram for the group of stores is identified by the layout plan strategy platform, automatically correct at least one of the end date assigned to the parent planogram for the group of stores and the start date assigned to the child planogram for the group of stores to remove the overlap in time;

generate an output, to the user interface, comprising the child planogram, wherein the child planogram applies to the group of stores, the output being available to a planogram layout platform;

create, at the planogram layout platform, based on the output, a planogram visual display comprising planogram schematics, wherein the planogram schematics show at least one of the item layout, item number, and item orientation in the group of stores;

transmit the planogram schematic to one or more stores of the group of stores for utilization of the planogram schematic in modification of a layout of the one or more stores for the item category, prior to the start date assigned to the child planogram; and upon the passing of the end date assigned to the child planogram for the group of stores, automatically re-assign the parent planogram to the group of stores such that the parent planogram applies to the plurality of stores.

15. The system of claim 14, wherein the first computer system and the second computer system are within an enterprise.

16. The system of claim 14, further comprising instructions to:
assign the parent planogram to remain applicable to a remainder of the plurality of stores after the start date of the child planogram, wherein the remainder does not comprise the group of stores.

17. The system of claim 14, wherein the parent planogram and the child planogram represent the same physical space within the plurality of stores, and wherein the child planogram and the planogram each represent a different item layout within the physical space.

18. The system of claim 14, wherein generating the child planogram, wherein the child planogram applies to the group of stores, avoids a need for creating a multitude of alternate child planograms, each of the multitude of alternate child planograms applying to each store of the group of stores.

* * * * *